United States Patent
Hohl

(10) Patent No.: US 6,796,511 B2
(45) Date of Patent: Sep. 28, 2004

(54) FUEL INJECTION VALVE AND A METHOD FOR OPERATING THE SAME

(75) Inventor: Guenther Hohl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 10/182,930

(22) PCT Filed: Feb. 2, 2001

(86) PCT No.: PCT/DE01/00485

§ 371 (c)(1),
(2), (4) Date: Nov. 21, 2002

(87) PCT Pub. No.: WO01/57392

PCT Pub. Date: Aug. 9, 2001

(65) Prior Publication Data

US 2003/0127531 A1 Jul. 10, 2003

(30) Foreign Application Priority Data

Feb. 4, 2000 (DE) .......................................... 100 04 960

(51) Int. Cl.[7] .............................. F02D 1/06; F02D 7/00; B05B 1/30; F02M 51/00; F16K 31/02
(52) U.S. Cl. ..................... 239/5; 239/585.1; 239/585.5; 239/533.2; 239/533.9; 251/129.1; 251/129.09
(58) Field of Search ....................... 239/5, 585.1, 585.5, 239/533.2, 533.9; 251/129.1, 129.09; 123/490, 499

(56) References Cited

U.S. PATENT DOCUMENTS

| 4,342,443 | A | * | 8/1982 | Wakeman | ............... 251/129.08 |
|---|---|---|---|---|---|
| 4,972,996 | A | * | 11/1990 | Cerny | ....................... 239/585.4 |
| 5,141,164 | A | * | 8/1992 | Ohno et al. | ............... 239/585.2 |
| 6,036,120 | A | * | 3/2000 | Varble et al. | ............. 239/585.1 |
| 6,260,768 | B1 | * | 7/2001 | Timms | ......................... 239/88 |
| 6,321,999 | B1 | * | 11/2001 | Male et al. | .................... 239/96 |
| 6,405,940 | B2 | * | 6/2002 | Harcombe et al. | ............. 239/88 |

FOREIGN PATENT DOCUMENTS

| DE | 19 11 827 | 9/1970 |
|---|---|---|
| DE | 23 06 007 | 9/1973 |
| DE | 44 03 148 | 8/1995 |
| GB | 2 152 135 | 7/1985 |
| JP | 57 168 052 | 10/1982 |

* cited by examiner

*Primary Examiner*—Michael Tokar
*Assistant Examiner*—Darren Gorman
(74) *Attorney, Agent, or Firm*—Kenyon & Kenyon

(57) ABSTRACT

A fuel injector (1), especially an injector for fuel injection systems of internal combustion engines, includes a first solenoid coil (5), which cooperates with the first armature (9), a valve needle (13) in a force-locking connection with the first armature (9) for actuating a valve-closure member (14), which together with a valve seat surface (15) forms a sealing seat, and a second solenoid coil (6). In this context, the first armature (9) is acted upon in a closing direction by a first resetting spring (11). A second armature (10) cooperates with the second solenoid coil (6) such that, when the first solenoid coil (5) and the second solenoid coil (6) are supplied with current, a limit stop body (18) that is connected with the valve needle (13) strikes against the second armature (10).

13 Claims, 2 Drawing Sheets

FUEL INJECTION VALVE AND A METHOD FOR OPERATING THE SAME

BACKGROUND INFORMATION

Figure 1:
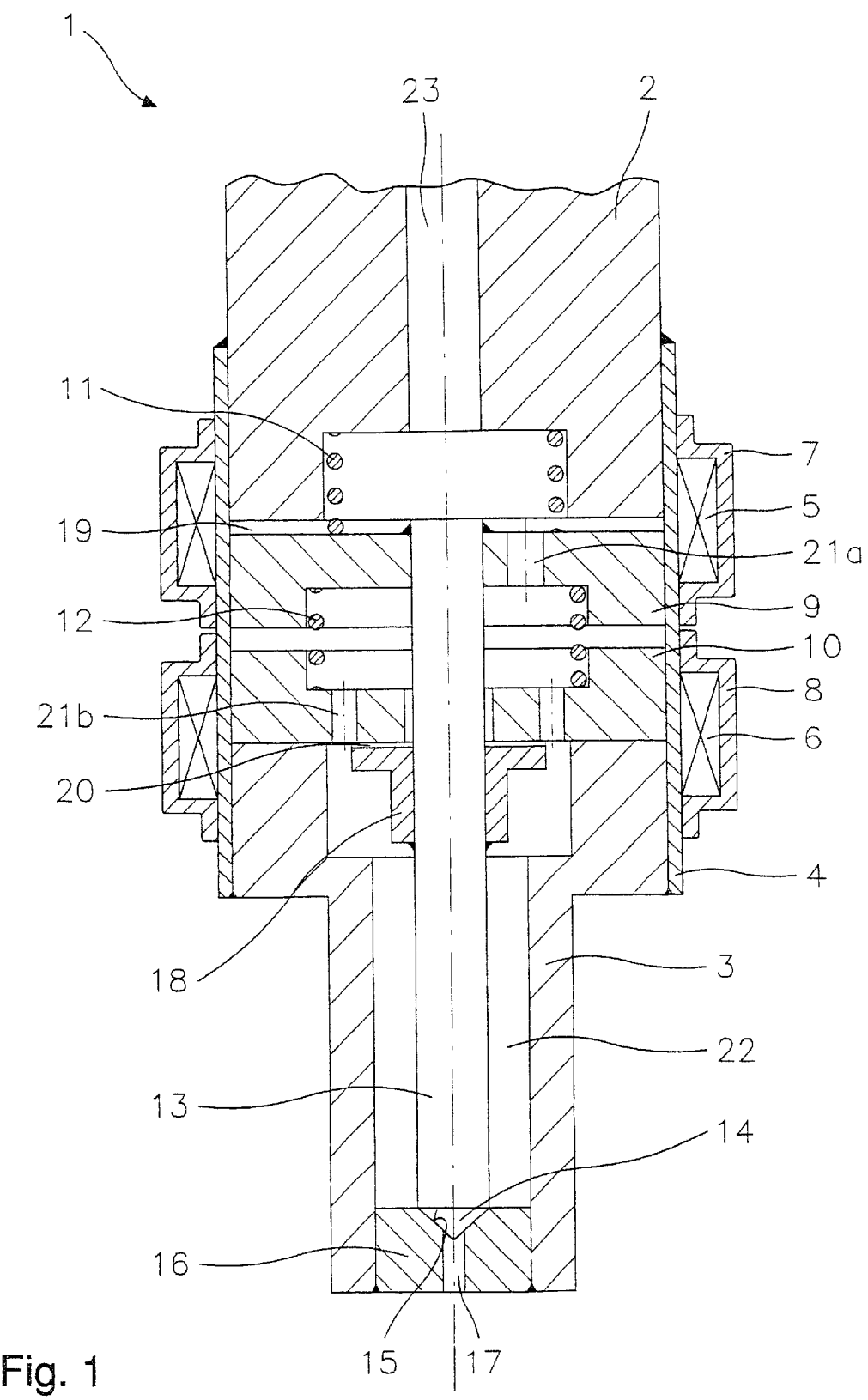

The present invention relates to a fuel injector according to the species of claim 1, and to a method according to the species of claim 9, for the actuation of a fuel injector.

The closing times of fuel injectors are lengthened, on the one hand, by the adhesion forces between the armature and the core and, on the other hand, by eddy currents. To decrease the delay, it is known to cause a current to flow through the solenoid coil in the reverse direction in response to ending the current pulse that excites the fuel injector, in order to accelerate the decay of the residual field. Designing appropriate control elements is difficult and also yields only slight improvements in the closing times.

Another possibility is seen in building up one magnetic field for opening the fuel injector and building up a second magnetic field to hold the fuel injector in its open position. The strength of the holding field can then be selected so as to be so small that the eddy currents are small after the holding field is switched off.

From German Patent 23 06 007 C3, an electromagnetically actuatable fuel injector is known for injecting fuel into an internal combustion engine, in which the solenoid coil has three windings, which are driven by three separate circuits. In this context, the first circuit acts to rapidly open the fuel injector, the second circuit to keep the fuel injector open, and the third to generate a demagnetizing field that extinguishes the residual magnetic field, for rapidly closing the fuel injector.

One disadvantage in the fuel injector known from German Patent 23 06 007 C3 is that it is very expensive to manufacture an arrangement that has three circuits, which drive the three windings of the solenoid coil.

In addition, the spray-discharged fuel quantity per time unit is always identical, so that the metering of smaller fuel quantities in the lower rotational speed range of the internal combustion engine must be realized through a significantly shortened closing time and therefore through more powerful resetting springs and necessarily increased drive outputs of the solenoid coils. This places stress on the electrical components.

ADVANTAGES OF THE INVENTION

In contrast, the fuel injector according to the present invention having the features of claim 1, and the method according to the present invention having the features of claim 9, have the advantage that the metered fuel quantity per time unit can be switched over as a function of the rotational speed, because two switch positions are available, which can be driven individually in a selective manner, as a result of the alternating supply of current to two solenoid coils that cooperate with two armatures.

In this context, one advantage for the opening dynamics is especially the installation of a limit stop body, which, depending on the supply of current to the solenoid coils, either takes the second armature with it in the opening direction or strikes against the second anchor that is held fixed in place.

As a result of the measures indicated in the subclaims, advantageous refinements and improvements of the fuel injector described in claim 1, are possible.

Especially advantageous are the high closing dynamics, caused by the active switching back of the fuel injector from the opened to the closed state, the closing dynamics making possible very short closing times from both switch positions.

As a consequence of the closely-fitting dimensioning of the two working gaps, the fuel injector can achieve the desired injection properties for each switch position.

The first switch position having a small cross-sectional opening is especially advantageous in the lower rotational speed range, because small fuel quantities can be metered.

Also advantageous is the possibility of being able to switch from the lower switch position directly to the upper switch position.

DRAWING

Figure 2:
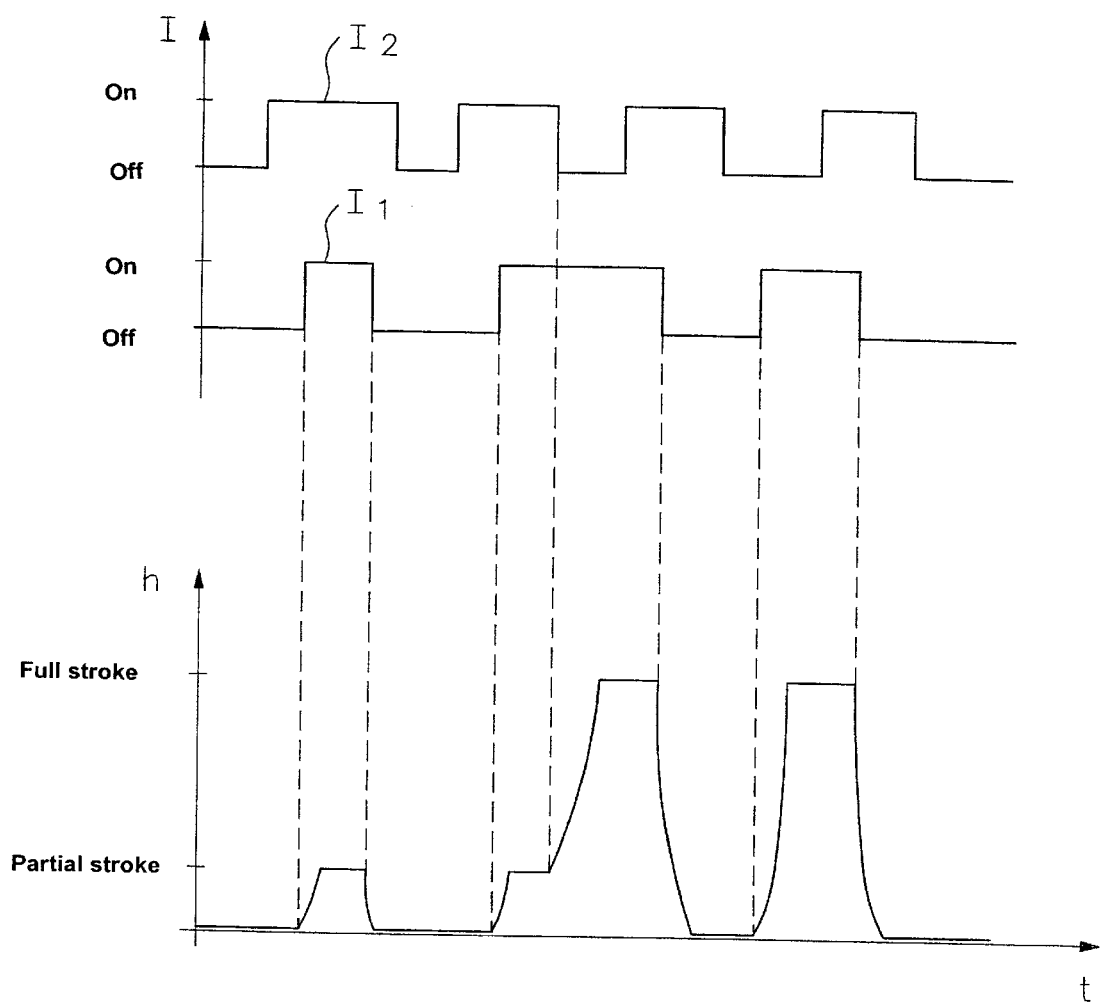

One exemplary embodiment of the present invention is depicted in simplified form in the drawing and is discussed in greater detail in the description below. The following are the contents:

FIG. 1 depicts an exemplary embodiment of a fuel injector according to the present invention in a cutaway representation and FIG. 2 depicts a diagram of the current-supply state of the solenoid coils for the switch positions of the exemplary embodiment of the fuel injector according to the present invention depicted in FIG. 1, as well as the corresponding stroke of the valve needle as a function of time.

DESCRIPTION OF THE EXEMPLARY EMBODIMENT

FIG. 1 in a partial cutaway representation shows the spray-discharge-side part of a fuel injector 1. Fuel injector 1 is particularly well suited for the direct injection of fuel into a combustion chamber, not depicted further, of a mixture-compressing, spark-ignition internal combustion engine.

Fuel injector 1 includes a core 2 and a nozzle body 3, which are surrounded by a valve housing 4. A first solenoid coil 5 and a second solenoid coil 6 are arranged on valve housing 4 and are surrounded by a first magnetic backflow body 7 and a second magnetic backflow body 8, respectively. Arranged between core 2 and nozzle body 3 are a first armature 9 and a second armature 10, which cooperate with solenoid coils 5 and 6. First armature 9 is acted upon in the closing direction by a first resetting spring 11, whereas second armature 10, in the idle state of fuel injector 1, rests on nozzle body 3. Clamped between first armature 9 and second armature 10 is a second resetting spring 12, which acts upon second armature 10 in the closing direction. The spring force of first resetting spring 11 is significantly greater than the spring force of second resetting spring 12.

Connected to first armature 9 is a valve needle 13, which at its spray-discharge-side end has a valve-closure member 14. Valve-closure member 14, together with a valve seat surface 15, forms a sealing seat and is held in a sealing position on valve seat surface 15 of a valve seat body 16 by first resetting spring 11. At least one spray-discharge opening 17 is configured in valve seat body 16.

A sleeve-shaped limit stop body 18 is mounted on valve needle 13 in a form-locking manner. A first working gap 19 is created between first armature 9 and core 2. A second working gap 20 is created between second armature 10 and limit stop body 18. In this context, first working gap 19 is larger than second working gap 20.

The fuel is conveyed to the sealing seat via a central fuel supply 23 and fuel channels 21a, 21b in armatures 9 and 10, as well as through a central cut out 22 of nozzle body 3.

If an excitation current is applied to first solenoid coil 5, first armature 9 moves in the opening direction along with valve needle 13, connected to it. Valve-closure member 14 lifts off from valve seat surface 15. If second solenoid coil 6 remains without current supply, then first armature 9 traverses one stroke, which corresponds to the axial extension of first working gap 19. In this context, first armature 9 moves in the opening direction along with valve needle 13 and limit stop body 18, mounted thereon, until limit stop body 18 strikes against second armature 10. Since second armature 10 can be displaced against the force of second resetting spring 12, the armature is moved in the opening direction as a result of the motion of valve needle 13 via limit stop body 18. After the closing of first working gap 19, an upper switch position is reached. The fuel is spray-discharged into the combustion chamber via spray-discharge opening 17.

At lower rotational speeds of the internal combustion engine, fuel injector 1 is not opened to the upper switch position, but only to a lower switch position. The stroke path then corresponds to the axial size of second working gap 20. For this purpose, second solenoid coil 6 is first supplied with current. This causes second armature 10 to be held in position on nozzle body 3. If first solenoid coil 5 is now supplied with current, then first armature 9, along with valve needle 13, mounted thereon, moves in the opening direction until limit stop body 18 strikes against second armature 10. Because second solenoid coil 6 is supplied with current and holds second armature on nozzle body 3, fuel injector 1 is only opened to the lower switch position. In this manner, a smaller quantity of fuel can be metered, which in addition has a different jet spray property, e.g., a different angle distribution.

To close fuel injector 1 from the upper switch position, both solenoid coils 5 and 6 are supplied with current. If the current, exciting first solenoid coil 5, is switched off, both the force of first resetting spring 11 as well as the magnetic force of second solenoid coil 6 act in the closing direction. Fuel injector 1 in this manner is actively switched from the opened to the closed state.

If the excitation current of first solenoid coil 5 is switched off, first armature 9, along with valve needle 13 connected thereto, as well as second armature 10, are accelerated from the upper switch position in the closing direction, as a result of the resetting force of first resetting spring 11, in that the magnetic force of second solenoid coil 6 actively pulls second armature 10 in the closing direction. As a result of the cooperation of the various forces and the fact that first resetting spring 11 needs only to accelerate first armature 9 and a valve needle 13 in the closing direction, but not second armature 10, short closing times are achieved.

The closing of fuel injector 1 from the lower switch position also occurs by switching off the current that excites first solenoid coil 5. Because second armature 10 on nozzle body 3 is held in position by current-supplied second solenoid coil 6, only first armature 9, along with valve needle 13, has to be accelerated in the closing direction. Here the resetting force of first resetting spring 11 causes the closing of fuel injector 1. As a result of the small stroke, valve-closure member 14 is rapidly put back into the starting position, which also results in short closing times.

To illustrate the switching processes, FIG. 2 depicts the current-supplied and non-current-supplied states of first solenoid coil 5 and of second solenoid coil 6, in connection with a diagram which shows valve stroke h as a function of time t. The electrical current through first solenoid coil 5 is designated as $I_1$, and the electrical current through second solenoid coil 6 as $I_2$. In the lower rotational speed range of the internal combustion engine, when only a small fuel quantity is metered, fuel injector 1 is switched to the lower switch position. For this purpose, second solenoid coil 6, which holds second armature 10 on nozzle body 3, is initially supplied with current. As a result, when first solenoid coil 5 is supplied with current, first armature 9, along with valve needle 13 mounted thereon, is only lifted to the point that limit stop body 18 strikes against second armature 10. The closing of fuel injector 1 from the lower switch position is performed by switching off current $I_1$, which excites first solenoid coil 5 (diagram left).

If the upper switch position is to be driven, second solenoid coil 6 remains unsupplied with current, whereas first solenoid coil 5 is excited. As a result, first armature 9 lifts valve needle 13 to the point that first armature 9 strikes against core 2 and first working gap 19 is closed. To terminate the opening process, second solenoid coil 6 is also supplied with current. However, first armature 9, along with valve needle 13 mounted thereon, is still held on core 2. If current $I_1$, which excites first solenoid coil 5, is now switched off, then the magnetic field of first solenoid coil 5 is eliminated, and first armature 9 falls away from core 2. First armature 9 is switched back to the closing position by the resetting force of first resetting spring 11 and by the magnetic force of second solenoid coil 6. The closing process can therefore proceed significantly more rapidly, because, in addition to the resetting force of first resetting spring 11, the magnetic force of second solenoid coil 6 is also available for the closing process (diagram right).

If fuel injector 1 is first to be switched to lower switch position and then to the upper switch position, solenoid coils 5 and 6 are supplied with current in the following manner: first, second solenoid coil 6 is excited, to hold second armature 10 on nozzle body 3. If first solenoid coil 5 is now supplied with current, first armature 9, along with valve needle 13, is moved in the stroke direction until limit stop body 18 strikes against second armature 10. Thus the first, stable switch position is reached. First solenoid coil 5 and second solenoid coil 6 are supplied with current. To switch from the lower, first switch position to the upper, second switch position, current $I_2$, which excites second solenoid coil 6, is switched off. In this manner, the magnetic field that holds second armature 10 on nozzle body 3 is removed, thus making it possible for first armature 9, taking with it second armature 10, to be further pulled into the magnetic field of first solenoid coil 5, until first working gap 19 is closed. If the upper switch position is reached, then only first solenoid coil 5 is supplied with current.

To close fuel injector 1, second solenoid coil 6 is once again supplied with current. After a satisfactory build-up of the magnetic field of second solenoid coil 6, first solenoid coil 5 is switched off. As a result, fuel injector 1 returns to the initial position (diagram center).

The present invention is not limited to the exemplary embodiment depicted and can also be realized in a multiplicity of other designs of fuel injectors 1.

What is claimed is:

1. A fuel injector, comprising:
   a first armature;
   a first solenoid coil that cooperates with the first armature;
   a valve-closure member;
   a valve seat surface;
   a valve needle in a force-locking connection with the first armature for actuating the valve-closure member, the valve-closure member and the valve seat surface forming a sealing seat;

a first resetting spring that acts upon the first armature in a closing direction;

a second solenoid coil; and a second armature that cooperates with the second solenoid coil, such that, when the first solenoid coil and the second solenoid coil are supplied with current, a limit stop body connected to the valve needle strikes against the second armature.

2. The fuel injector according to claim 1, wherein:

the fuel injector is for a fuel injection system of an internal combustion engine.

3. The fuel injector according to claim 1, further comprising:

a second resetting spring clamped between the first armature and the second armature and for acting upon the second armature in the closing direction.

4. The fuel injector according to claim 1, wherein:

a spring force of the second resetting spring is substantially smaller than a spring force of the first resetting spring.

5. The fuel injector according to claim 1, wherein:

a first working gap is configured between a core and the first armature, and a second working gap is configured between the limit stop body and the second armature, the first working gap being larger than the second working gap.

6. The fuel injector according to claim 5, where in:

The fuel injector can be switched to a first switch position having a first cross-sectional opening by closing the second working gap as a consequence of supplying current to the first solenoid coil and to the second solenoid coil.

7. The fuel injector according to claim 6, wherein:

the fuel injector can be switched to a second switch position having a second cross-sectional opening by closing the first working gap as a consequence of supplying current to the first solenoid coil only.

8. The fuel injector according to claim 7, wherein:

the first cross-sectional opening is smaller than the second cross-sectional opening.

9. The fuel injector according to claim 7, wherein:

the fuel injector in the second switch position spray-discharges a fuel jet having a jet image different from a jet image of the fuel jet spray-discharged in the first switch position.

10. A method for actuating a fuel injector having a first armature, a first solenoid coil that cooperates with the first armature, a valve-closure member, a valve seat surface, a valve needle in a force-locking connection with the first armature for actuating the valve-closure member, the valve-closure member and the valve seat surface forming a sealing seat, a first resetting spring that acts upon the first armature in a closing direction, a second solenoid coil, and a second armature that cooperates with the second solenoid coil, such that, when the first solenoid coil and the second solenoid coil are supplied with current, a limit stop body connected to the valve needle strikes against the second armature, the method comprising:

performing one of the following:

switching the fuel injector to a first switch position having a first cross-sectional opening by supplying current jointly to the first solenoid coil and to the second solenoid coil, and switching the fuel injector to a second switch position having a second cross-sectional opening that is larger than the first cross-sectional opening by supplying current only to the first solenoid coil.

11. The method according to claim 10, wherein:

the fuel injector is for a fuel injection system of an internal combustion engine.

12. The method according to claim 10, wherein:

the fuel injector is switched to the second switch position from the first switch position by switching off the current exciting the second solenoid coil.

13. The method according to claim 10, wherein:

the fuel injector is switched from the second switch position to a closing position by supplying current to the second solenoid coil, operating in the closing direction, and by switching off the current exciting the first solenoid coil.

* * * * *

UNITED STATES PATENT AND TRADEMARK OFFICE
CERTIFICATE OF CORRECTION

PATENT NO.    : 6,796,511 B2
DATED         : September 28, 2004
INVENTOR(S)   : Guenther Hohl It is certified that error appears in the above-identified patent and that said Letters Patent is hereby corrected as shown below:

Title page,
Item [57], ABSTRACT, delete "(1) (5) (9) (15) (9) (14) (15) (6) (9) (11) (10) (18) (13) (10)"

Column 1,
Line 5, change "Background Information" to -- Field of the Invention --
Lines 6-7, delete "according to the species of claim 1,"
Lines 7-8, delete "according to the species of claim 9"
Line 9, insert -- Background Information --
Lines 24 and 35, change "23 06 007 C3" to -- 23 06 007 --
Line 47, change "Advantages of the Invention" to -- Summary of the Invention --
Lines 63-65, delete "As a result ...are possible."

Column 2,
Line 13, delete "Drawing"
Lines 14-17, delete "One exemplary...the contents."
Line 17, insert -- Brief Description of the Drawings --
Lines 19-20, change "cutaway representation, and" to -- cutaway representation. --
Line 27, change "Description of the Exemplary Embodiment" to -- Detailed Description --

Signed and Sealed this

Twenty-sixth Day of July, 2005

JON W. DUDAS
*Director of the United States Patent and Trademark Office*